Figure 1:
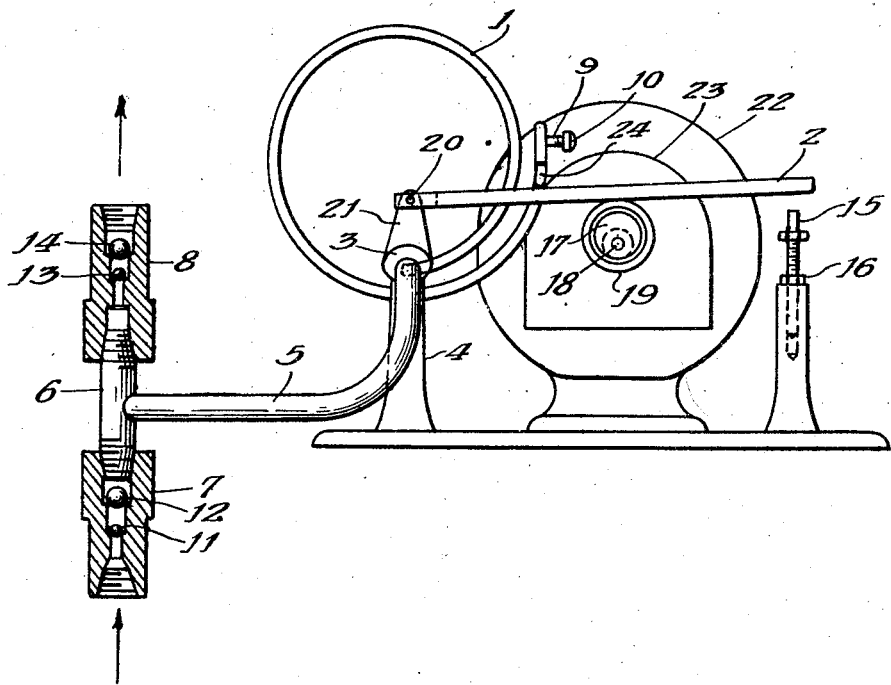

Oct. 14, 1947.   H. A. HULSBERG   2,428,912
FLUID PUMP
Filed Dec. 29, 1945

Inventor:
Herbert A. Hulsberg
By: Maynard P. Venema
    Attorney.

Patented Oct. 14, 1947

2,428,912

UNITED STATES PATENT OFFICE 2,428,912

FLUID PUMP

Herbert A. Hulsberg, Hinsdale, Ill., assignor to Universal Oil Products Company, Chicago, Ill., a corporation of Delaware Application December 29, 1945, Serial No. 638,352

4 Claims. (Cl. 103—148)

This invention provides an improved form of small pump which can deliver small quantities of liquid at superatmospheric pressures. The pump is of the surge type which is packless and makes use of conventional inlet and outlet check valves that are remote from the pumping mechanism.

More specifically the pump comprises a Bourdon type of tube, mounted in a manner to have its free end periodically deflected, while the open end is fixed and connected to a surge line communicating with inlet and outlet check valves. The deflection of the Bourdon tube causes a cross-sectional deformation and an accompanying change in the volume within the tube, such that a fluid material within the Bourdon tube is automatically surged back and forth in the manner of a liquid piston.

The packless feature of this pump is of particular advantage in handling hot or corrosive liquids, since they may be kept away from the deflecting tube by a non-corrosive and non-compressible liquid which may be provided within the Bourdon tube and the connecting surge line. Pumps requiring a packing material around moving parts are at a particular disadvantage where corrosive materials are handled or when high pressures are involved. A pump of this type is of utility for pumping small accurately regulated quantities of fluid or for injecting small quantities of reagents, additives, or the like into a pressure zone.

Bellows members and flexible diaphragms have been rather extensively used in various types of surge pumps now in present use. However, flexible bellows have been rather limited to low allowable pressures, and since they require longitudinal flexibility, the corrugated wall thicknesses have been minimized and high allowable pressures sacrificed. It has also been found that bellows cylinders require guiding means to keep them in alignment and to prevent excessive deformation and rupture. Similarly, for flexible diaphragms, high superatmospheric pressures require a relatively heavy or stiff plate which is not capable of being moved easily and accurately to provide a controlled pumping or injection operation. The Bourdon tube provides an improved type of element for a surge pump that is easily moved and deformed and is not subjected to failure from high pressures or from fatigue stresses. By Bourdon tube is meant a spiral, helical, semi-circular or like tube which deforms under pressure to cause an internal volumetric change. There is no particular form of Bourdon tube required, that is, the cross-section of the tube may be elliptical, oval, flat with rounded ends or of any other desired shape.

In a simple embodiment of the improved form of pump, the tubular element is preferably circular or elliptical in cross-section, since these shapes are capable of withstanding relatively high pressures. Also, the Bourdon tube is preferably made spiral or circular in form, so that the deflection of the closed end may be readily accomplished and controlled by an eccentric wheel or cam that is normally adjustable. The cam may be driven by an electric motor operating through a gear reducer or by any other desirable mechanical means. The open end of the tube connects to a surge line which in turn connects with inlet and outlet valves, of the ball-check type, that allow liquid flow therethrough in one direction only.

The accompanying drawing shows a simplified embodiment of the improved form of surge pump comprising the invention and the following description thereof will serve to make the method of construction and its features more apparent.

Figure 1 of the drawing shows an elevational view partially in cross-section of the pump assembly.

Figure 2:
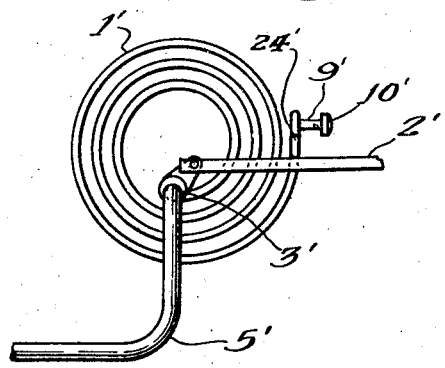

Figure 2 of the drawing shows an alternate form of the Bourdon tube or tubular element which provides the pumping means.

Referring now to Figure 1 of the drawing, a Bourdon tube 1 is mounted so that its closed end is free to be deflected by a moving bar 2. The open end of the tube 1 terminates in a coupling 3, which is attached to a supporting post 4. The coupling 3 serves to connect the Bourdon tube 1 with surge line 5.

The deflection and deformation of the tube 1 results in a slight change in its cross-sectional area, or in other words, a flattening of a portion of the tube. Thus, the volume of the tube is slightly reduced and there is a movement of fluid material outwardly into line 5. When the tube 1 returns to its normal position, the liquid returns to tube 1, receding through line 5. The surge line 5 through T-portion 6 is connected to an inlet valve block 7 and outlet valve block 8.

A small bleeder nozzle 9 with a cap 10 is provided at the closed end of the Bourdon tube 1 in order that all of the air or gas, which may be trapped in the tube, can be expelled or vented and tube 1 allowed to be completely filled with liquid.

A suitable non-compressible and non-corrosive fluid is preferably used within the tube 1 and surge line 5. Such a fluid may be mercury, glycerine, hydrocarbon oil, water, or the like, and when desirable may be one which is immiscible with the liquid being pumped. As the liquid advances and recedes in line 5, a fluid material may be pumped through valves 7 and 8 and line 6. Fluid is drawn into the T-portion 6 through block 7, around ball-check valves 11 and 12, and upon deformation of the Bourdon tube 1 the slight outward surge of liquid therein causes the indrawn fluid to be discharged through T 6 and block 8 past ball-check valves 13 and 14.

The moving bar 2, operates in the manner of a rocker arm to raise and lower the closed end of the tube. A projecting lug-like member or arm 24 is attached to the side of the tube 1 and contacts the bar 2. One end of the bar 2 is pivoted by means of pin 20 and supporting bearing 21 that extends from the elbow 3, while the opposite end of the bar 2 is free, being restricted in its downward movement only, by adjustable stop 15. The stop 15 is made adjustable as to height, with adjustment accomplished by its threaded lower end and the threaded support member 16. The lock nut 16 provides means to lock and secure the stop 15 in place after it has been adjusted to a desired elevation.

The bar 2 may be raised and lowered by various mechanical devices; however, as indicated in the drawing, a cam 17 attached to shaft 18 provides a very satisfactory method of operation. The maximum amount of travel being determined by the offset in the cam provided, while a lesser amount is obtainable, down to zero movement by adjustment of stop 15. The outer periphery of the cam 17 in a preferable embodiment has a ball race 19 that is attached thereto, in order to provide a minimum amount of frictional resistance in contacting the bar 2. The cam 17 and shaft 18 is rotated by means of any type of prime mover, and in the form shown, a suitable electric motor 22 and gear reducer 23 provide the driving means for the pump. A gear reducer, which has adjustability as to different speeds, is particularly desirable to provide flexibility of operation to the improved type of pump.

In operation, the alternate raising and lowering of the bar 2 by the cam 17 provides the deformation of Bourdon tube 1 and the continuous back and forth surge within line 5, which in turn accomplishes the pumping operation through the valve blocks 7 and 8. The suction and discharge rate through the valves, or in other words, the rate of pumping is controlled by the motor 22 and the speed given the rotating shaft 18 from the gear reducer 23. The volume of discharge per stroke may be adjusted by controlling the vertical displacement or deflection of the tube 1 which in turn is dependent on the size of cam 17 and the setting of stop 15. Of course, the length and the size or shape of the Bourdon tube used also governs the volumetric amount of discharge.

Figure 1 of the drawing shows a Bourdon tube 1 which is circular in form, but of relatively short length, while in Figure 2 of the drawing a longer spiral form of Bourdon tube 1' is illustrated. The bar 2' and suction line 5' correspond to the similar parts shown in Figure 1 and function in a similar manner. The longer Bourdon tube 1' will have less deflection per unit of length; however, the longer length will provide for an increased volumetric displacement of fluid material from within the tubular element.

I claim as my invention:

1. A surge pump of the class described comprising in combination, a flexible curved tube having a closed end and an open end, supporting means fixing the open end of said tube, a movable lever pivoted at one end to said supporting means and contacting the closed end of said curved tube, means for oscillating said lever to periodically deflect said closed end, inlet and outlet valves communicating with said open end of said tube through a surge line, and a substantially non-compressible fluid within said curved tube to be alternately drawn in and expelled therefrom as said tube is deflected.

2. A surge pump of the class described comprising in combination, a pressure tight flexible curved tube having a closed end and an open end, supporting means fixing the open end of said tube, a movable lever pivoted at one end to said supporting means and contacting the closed end of said curved tube, means for oscillating said lever to periodically deflect said tube, means for adjusting the oscillation of said lever to control the amount of tube deflection, inlet and outlet valves communicating with said open end of said tube through a surge line, and a substantially non-compressible fluid within said curved tube to be alternately drawn in and expelled therefrom as said tube is deflected.

3. A surge pump of the class described comprising in combination, a pressure tight Bourdon tube having a closed end and an open end, supporting means fixing the open end of said tube, a movable lever pivoted at one end to said tube supporting means, a projection from the closed end of said tube adapted to engage said lever, a prime mover and a connecting gear reducer, a rotating cam driven by said gear reducer and positioned to contact the lower side of said lever, a threaded stop adjustable to control the vertical travel of the free end of said lever, gas venting means at the closed end of said tube, inlet and outlet valves communicating with said open end of said tube through a surge line, and a substantially non-compressible fluid material within said tube to be alternately drawn in and expelled therefrom as said tube is deflected.

4. A surge pump as described in claim 3 further characterized in that said pressure tight Bourdon tube is spirally wound having said open end of the tube on the inside and the closed end of said tube on the outside of the spiral.

HERBERT A. HULSBERG.

REFERENCES CITED

The following references are of record in the file of this patent:

UNITED STATES PATENTS

| Number | Name | Date |
| --- | --- | --- |
| 1,793,180 | Scott | Sept. 11, 1934 |
| 2,254,539 | Mattox | Sept. 2, 1941 |

FOREIGN PATENTS

| Number | Country | Date |
| --- | --- | --- |
| 3,152 | Great Britain | 1904 |
| 108,771 | Great Britain | 1916 |
| 368,193 | Italy | 1939 |